No. 768,495. PATENTED AUG. 23, 1904.
H. D. WEED.
GRIP TREAD FOR PNEUMATIC TIRES.
APPLICATION FILED FEB. 9, 1904.
NO MODEL.
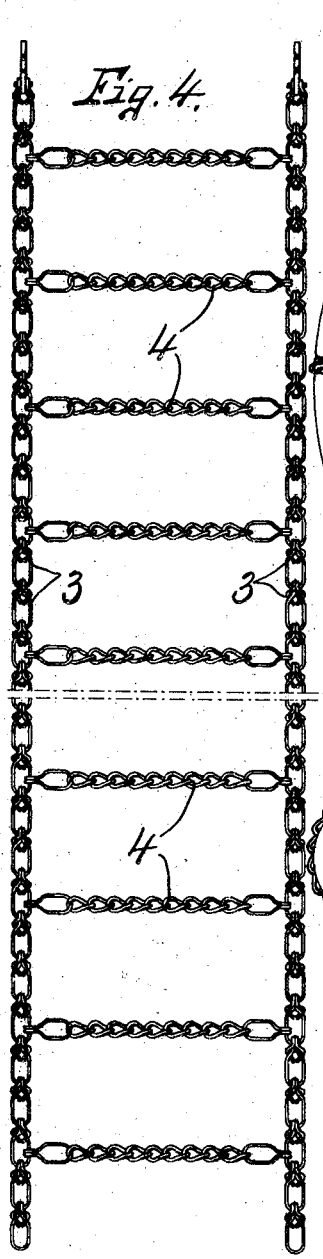
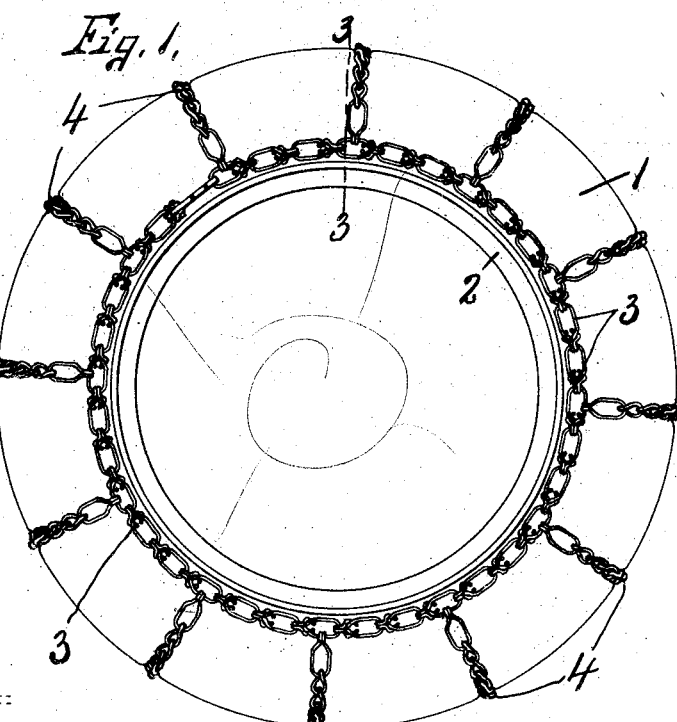
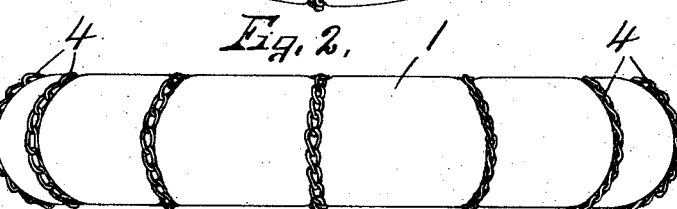
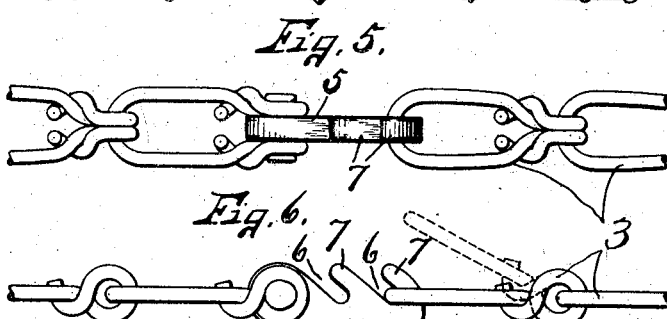
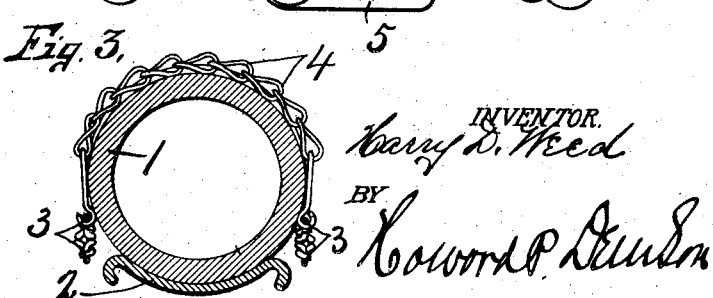
WITNESSES
B. E. Robinson
H. E. Chase
INVENTOR.
Harry D. Weed
BY
Howard P. Denison
ATTORNEY.

No. 768,495.

Patented August 23, 1904.

UNITED STATES PATENT OFFICE.

HARRY D. WEED, OF CANASTOTA, NEW YORK.

GRIP-TREAD FOR PNEUMATIC TIRES.

SPECIFICATION forming part of Letters Patent No. 768,495, dated August 23, 1904.

Application filed February 9, 1904. Serial No. 192,803. (No model.)

*To all whom it may concern:*

Be it known that I, HARRY D. WEED, of Canastota, in the county of Madison, in the State of New York, have invented new and useful Improvements in Grip-Treads for Pneumatic Tires, of which the following, taken in connection with the accompanying drawings, is a full, clear, and exact description.

This invention relates to improvements in treads for pneumatic tires, and is particularly applicable for use on the traction-wheels of automobiles to prevent the tire from slipping on slippery pavements.

The object of my present invention is to provide a flexible and collapsible grip or tread composed entirely of chains linked together and applied to the sides and periphery of the tire and held in place solely by the inflation of the tire, and which is reversible so that either side may be applied to the periphery of the tire, thus affording a double wearing-surface. These grips or auxiliary treads are adapted to be applied to the traction or driving wheels of automobiles, and one of the important objects is to enable any one skilled or unskilled to easily and quickly apply the auxiliary tread when needed by partially deflating the tire and then placing the grip thereon, and finally reinflating the tire to cause the transverse chains to partially embed themselves into the periphery of said tire, whereby the auxiliary tread or gripping device is firmly held in operative position against circumferential slipping on the tire.

Another object of equal importance is to construct the auxiliary grip or tread in such manner that it may be collapsed into a minimum space when not in use to be carried in the vehicle, and owing to the fact that it is constructed of chains with comparatively short links it will be apparent that it may be compressed into a very small space, and therefore can be placed under the seat or in any other available receptacle in the vehicle.

Other objects and uses will appear in the following description.

In the drawings, Figure 1 is an end elevation of a portion of a vehicle-wheel, showing the rim and a pneumatic tire and my improved tread or grip applied thereto and in operative position. Fig. 2 is a top plan of the parts seen in Fig. 1. Fig. 3 is a transverse sectional view taken on line 3 3, Fig. 1. Fig. 4 is a plan of the detached tread or gripping device, shown in its extended position, the central portion being broken away. Figs. 5 and 6 are enlarged detail views of a portion of the gripping device, showing particularly the means for connecting and adjusting the ends of the side chains.

Similar reference characters indicate corresponding parts in all the views.

In carrying out the objects stated it becomes necessary to make the gripping device flexible in all directions both circumferentially and transversely as well as radially and to avoid the use of rigid circumferential tie-rods at the sides of the tire, so that when the lower face or tread of the tire is compressed by the weight of the superimposed load, the transverse chains across the periphery will have a free flexing movement which readily conforms to the varying cross-sectional contour of the tread of the tire and still maintains a firm grip thereon, and under such conditions it is imperative that the portions of the circumferential chains yield readily to the varying conditions of the transverse chains, whereas if rigid circumferential rods or tie-pieces were used it would be necessary to provide them with a series of loops, and the continual buckling of the rod would soon cause the metal to crystallize and break at its joints with the transverse connections. My purpose, therefore, in constructing the gripping device wholly of chains is to permit the free flexing movement of the side pieces or anchors to which the cross-chains are secured, thereby obviating any liability of crystallization due to the buckling or irregular strains.

In order to demonstrate the practicability of my invention, I have shown a pneumatic tire 1 as mounted upon a rim 2, and upon this tire is placed my improved gripping device consisting of opposite parallel chains 3 and transverse chains 4, connecting the chains 3 at regular intervals throughout its length, the end links of the transverse chains 4 being permanently linked to similar links in the chains 3 directly opposite to each other and at right angles to the chains 3.

The end links, as 5, at one end of the chains 3 are of special construction for receiving end links at the opposite ends of the chains 3 to permit said ends to be detachably interlocked with each other and adjusted to conform to tires of different diameters. As seen in the drawings, these links 5 are provided with open-sided slots 6, which are undercut in the direction of pull when the chains are applied to the wheel to form a plurality of hooks 7, either of which may be interlocked with the end links at the opposite end of the chain on the same side of the wheel or tire.

It is well known that tires made by different manufacturers vary more or less in diameter, and this special construction of link just described permits the auxiliary tread or gripping device to be readily and easily applied when the tire is wholly or partially deflated, so that when said tire is reinflated the transverse chains embed themselves into the periphery of the tire.

The length of the chains 3 is substantially equal, but of slightly-greater length than the inner circumference of the tire, so as to fit around the periphery of the rim 2, but are of less length than the circle drawn through the center of the tire, and it is therefore apparent that when the gripping device is placed in operative position, as seen in Figs. 1 and 2, the chains 3 lie in the planes of the opposite end faces of the tire.

The chains 4 are of slightly less length than the arc measured on a cross-section of the tire between the chains 3 when the tire is inflated, and it therefore follows that when the tire is inflated the chains 4 are embedded in the periphery of the tire. The links of these cross-chains 4 are of round-wire-twisted type, which are extremely flexible and prevent any liability of abrasion or cutting of the tire and at the same time afford a series of grips at regular intervals throughout the periphery of the tire, which prevent slipping of said tire upon the pavement, and at the same time owing to the fact that the cross-chains are embedded into the tire they are also prevented from slipping relative to the tire, and yet the links are free to twist and turn in any direction to conform to the varying contours of the tread of the tire without liability of injuring the tire by abrasion. The links of the chains 3 are also made of round wire and are short, but comparatively broad and flat, so that when they are applied to the tire they lie flatwise against its sides. It is evident, however, that the exact form of the link is immaterial, as applicant claims, broadly, the use of the opposite chains at the sides of the tire to which the transverse chains 4 are flexibly connected.

In assembling this auxiliary tread or gripping device upon a wheel or tire said tire is first partially deflated, and the device is then drawn circumferentially around the tire, with the chains 3 at opposite sides thereof and their ends brought together and hooked in the manner seen in Fig. 6. This operation brings the intermediate cross-chains 4 transversely around the periphery of the tire substantially equidistant from each other, after which the tire is reinflated and the cross-chains naturally adjust themselves to the shortest distance around the tire between the chains 3 and are held in this position by being partially embedded in the tire when inflated. In removing the gripping device this operation is reversed—that is, the tire is partially deflated sufficient to permit the ends of the chains 3 to be detached from each other, whereupon the whole device may be then rolled or collapsed and placed under the seat of the vehicle or any other chamber and occupies a minimum space. Both sides or faces of the gripping-tread are substantially identical, and the tread is therefore reversible, so that either side may be used as the gripping-surface, and when one side is worn the tread may be reversed or turned inside out, thus affording double the amount of wearing-surface and increasing the life of the tread.

Having thus described my invention, what I claim, and desire to secure by Letters Patent, is—

1. A grip-tread for elastic tires comprising side chains flexible in all directions whereby they may be reversed side for side, interlocking members on the ends of said chain, and cross-chains having their ends secured to the side chains and their inner and outer faces similar whereby either face may be placed against the tire.

2. A grip-tread for elastic tires comprising parallel side chains composed of flat links disposed flatwise with reference to the adjacent faces of the tire, the opposite faces of said links being similar whereby the chains may be reversed side for side, fastening members on the ends of the chains detachably interlocked with each other, and cross-chains linked to the side chains and having both faces alike so that either face may be presented to the tire.

3. A grip-tread for elastic tires comprising two parallel side chains having a plurality of hooks at one end to receive the links of the opposite end, and cross-chains linked to the side chains and having both faces alike whereby either face may be presented to the tire.

4. A grip-tread for elastic tires comprising parallel lengthwise chains, the links at one end each having a plurality of hooks to receive the opposite end links, and parallel cross-chains equidistant from each other and connected to the lengthwise chains.

In witness whereof I have hereunto set my hand this 5th day of February, 1904.

HARRY D. WEED.

Witnesses:
H. E. CHASE,
MILDRED M. NOTT.